(12) United States Patent
Shibata (10) Patent No.: US 11,256,161 B2
(45) Date of Patent: Feb. 22, 2022

(54) IMAGING DEVICE

(71) Applicant: CANON KABUSHIKI KAISHA, Tokyo (JP)

(72) Inventor: Masayoshi Shibata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/441,868

(22) Filed: Jun. 14, 2019

(65) Prior Publication Data

US 2020/0393743 A1   Dec. 17, 2020

(51) Int. Cl.
*G03B 17/02* (2021.01)

(52) U.S. Cl.
CPC .................. *G03B 17/02* (2013.01)

(58) Field of Classification Search
CPC ........ G03B 17/00; G03B 17/02; G03B 17/56; G03B 17/561; G03B 17/566; G02B 7/02; H04N 5/2251; H04N 5/2252; H04N 5/2254; H04N 5/2257
USPC ........................................................ 396/535
See application file for complete search history.

(56) References Cited

U.S. PATENT DOCUMENTS

| | | | |
|---|---|---|---|
| 6,561,702 B1 | 5/2003 | Yik | |
| 7,106,858 B2 | 9/2006 | Goldberg | |
| D574,692 S | 8/2008 | Cooper | |
| 7,525,596 B2 | 4/2009 | Yamaguchi | |
| D592,530 S | 5/2009 | Ramsey | |
| 7,909,624 B2 | 3/2011 | Iida | |
| 2004/0203501 A1 | 10/2004 | Johnson | |
| 2004/0205255 A1 | 10/2004 | Joachim | |
| 2004/0209577 A1 | 10/2004 | Park | |
| 2005/0024526 A1 | 2/2005 | Wang | |
| 2005/0111308 A1* | 5/2005 | Hosey | G04B 37/148 368/317 |
| 2005/0162823 A1 | 7/2005 | Hosey | |
| 2008/0075275 A1 | 3/2008 | Goldberg | |
| 2009/0096919 A1 | 4/2009 | Wang et al. | |
| 2009/0102414 A1 | 4/2009 | Fowler | |
| 2009/0283559 A1 | 11/2009 | Foggiato | |
| 2012/0025684 A1 | 2/2012 | Trotsky | |

(Continued)

FOREIGN PATENT DOCUMENTS

| | | |
|---|---|---|
| CN | 1972611 A | 5/2007 |
| CN | 101236353 A | 8/2008 |

(Continued)

OTHER PUBLICATIONS

Argus Bean 5MP 16MB, 1.5IN LCD USB Li-on, Battery Blue; https://www.amazon.com/gp/product/B0019K4UHY/%3Ftag%3Ddegeeked-20; retrieved May 24, 2019.

*Primary Examiner* — Clayton E. LaBalle
*Assistant Examiner* — Fang-Chi Chang
(74) *Attorney, Agent, or Firm* — Canon U.S.A., Inc., IP Division (57) ABSTRACT

An imaging device includes a lens and a frame portion that forms an opening in an optical axis direction of the lens from a first surface towards a second surface of a housing of the imaging device in which at least a portion of the frame portion being an opening and closing member. In the imaging device, a projection of an opening of the first surface in the optical axis direction includes a projection of an opening of the second surface in the optical axis direction, and the opening of the first surface is larger than the opening of the second surface.

12 Claims, 9 Drawing Sheets

(56) References Cited

U.S. PATENT DOCUMENTS

| | | | |
|---|---|---|---|
| 2012/0074006 A1 | 3/2012 | Monaco | |
| 2015/0097008 A1* | 4/2015 | Adeyemi | A45F 5/021 |
| | | | 224/162 |
| 2017/0307004 A1* | 10/2017 | Cardella | E05B 15/102 |
| 2019/0269231 A1 | 9/2019 | Christian et al. | |

FOREIGN PATENT DOCUMENTS

| | | |
|---|---|---|
| CN | 101631439 A | 1/2010 |
| CN | 202270347 U | 6/2012 |
| CN | 206100281 A1 | 4/2017 |
| JP | 2004179850 A | 6/2004 |
| JP | 2009-147443 A | 7/2009 |
| WO | 2006/007296 A2 | 1/2006 |

* cited by examiner

IMAGING DEVICE

BACKGROUND

Field

The present disclosure relates to a configuration of an imaging device such as a digital camera.

Description of the Related Art

Imaging devices such as a digital camera include features such as providing a carabiner in a device main body that allow the digital camera to be carried easily and that improves portability thereof. For example, Japanese Patent Laid-Open No. 2009-147443 discloses a carabiner portion that is a member different from a housing of a digital camera and that is connected to a flexible cord member that can be wound around a cord reel.

SUMMARY OF THE DISCLOSURE

An imaging device includes a lens and a frame portion that forms an opening in an optical axis direction of the lens from a first surface towards a second surface of a housing of the imaging device in which at least a portion of the frame portion being an opening and closing member. In the imaging device, a projection of an opening of the first surface in the optical axis direction includes a projection of an opening of the second surface in the optical axis direction, and the opening of the first surface is larger than the opening of the second surface.

Further features will become apparent from the following description of exemplary embodiments with reference to the attached drawings.

DESCRIPTION OF EMBODIMENTS

First Exemplary Embodiment

Hereinafter, a first exemplary embodiment will be described with reference to FIGS. 1A to 4B.

Figure 1A:
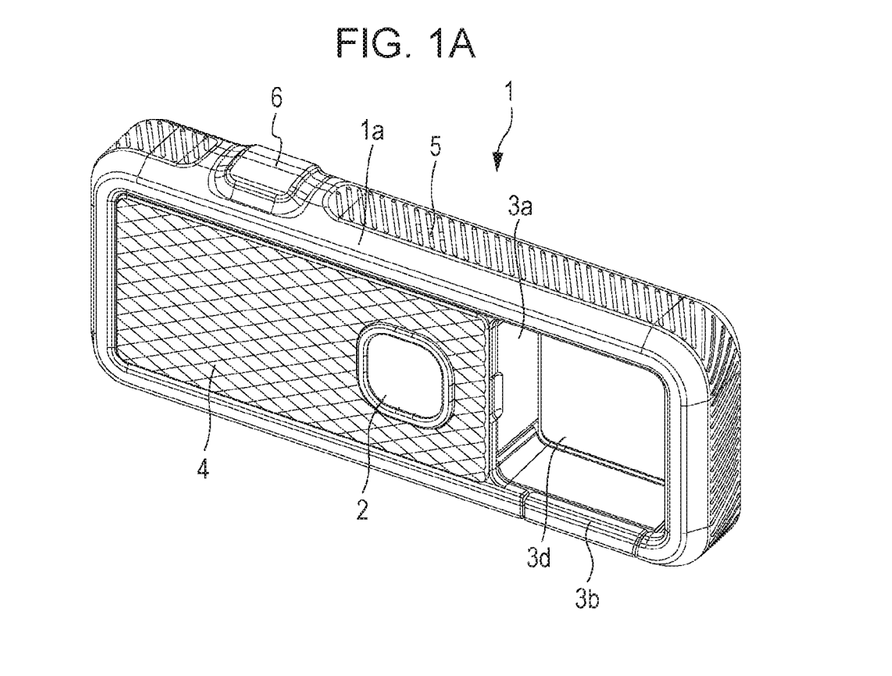
FIGS. 1A and 1B are external perspective views of a digital camera according to a first exemplary embodiment.
Figure 1B:
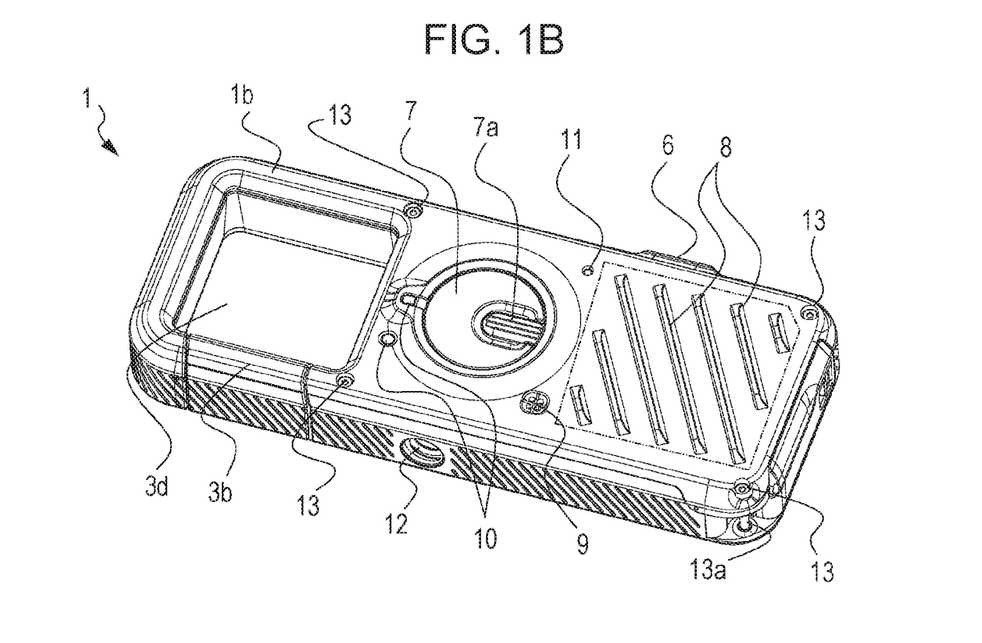

FIG. 1A is an external perspective view of a digital camera 1, which is an example of an imaging device according to a first exemplary embodiment, viewed from the front side (the object side) which will face the object being captured by the digital camera 1 during image capture. FIG. 1B is an external perspective view viewed from the back-side, which is opposite to the object side.

Figure 8A:
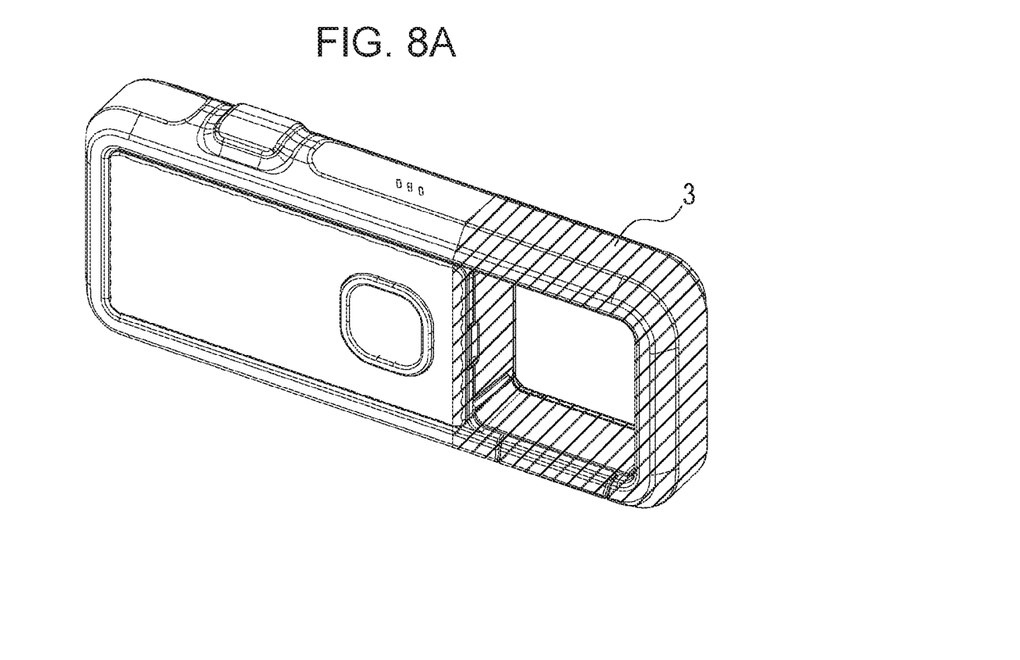
FIGS. 8A and 8B are drawings illustrating the carabiner portion of the digital camera.
Figure 8B:
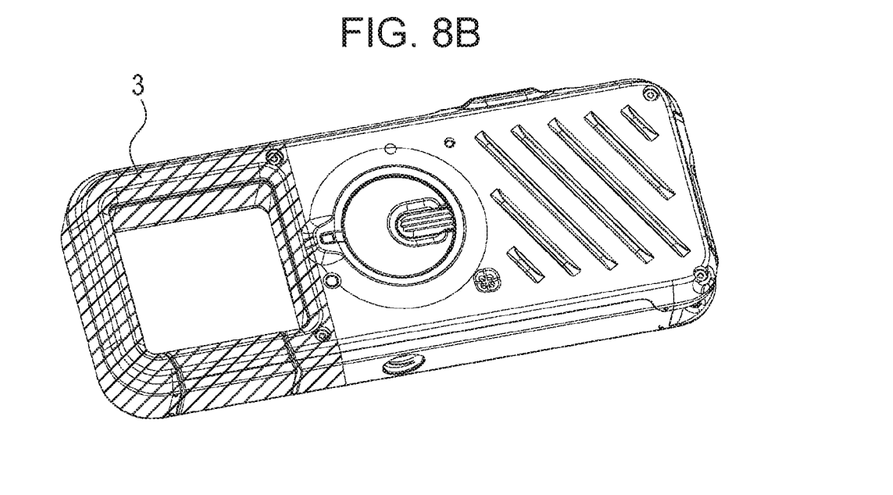

The digital camera 1 illustrated in FIGS. 1A and 1B includes a front cover 1a and a rear cover 1b serving as a body housing, and a lens portion 2. Furthermore, the digital camera 1 has a carabiner structure, and in the present exemplary embodiment, the hatched portions in FIGS. 8A and 8B are referred to as a carabiner portion 3. Note that the digital camera illustrated in FIGS. 8A and 8B is a digital camera in which portions of the digital camera 1 in FIGS. 1A and 1B have been illustrated in a simplified manner. The carabiner portion 3 will be described in detail later. A changeable panel 4 is a panel detachable from the digital camera 1. Details thereof will be described later as well. An audio input portion 5 enables capturing external audio from the outside and is particularly used when recording a video. In one embodiment, the audio input portion 5 is a microphone hole. A push-type release button 6 is provided on an upper surface portion, and the shooter can input a shooting instruction by performing an operation of pushing in the release button 6.

A mode switching dial 7, a back surface grip portion 8, an audio output portion 9 (e.g. loudspeaker hole), an LED window 10, a reset button 11 are provided on the rear cover 1b side, and a tripod hole 12 is provided in a camera bottom surface portion. The mode switching dial 7 is an operation member for performing switching of the shooting mode, such as moving image mode and still image mode, and an operation such as turning off the power. The back surface grip portion 8 is a member used as a finger rest on which a finger of the hand is placed while shooting and which enhances the gripping property. The back surface grip portion 8 has an uneven surface. Screws 13 are fastening members that fix the front cover 1a and the rear cover 1b to each other. The fastened front cover a and the fastened rear cover 1b form an exterior of the digital camera 1 of the present exemplary embodiment. Furthermore, by cutting out a portion of the exterior and exposing a portion of a screw shaft portion 13a of the screw 13 to the outside of the exterior, a strap hooking portion of a strap is formed.

Figure 2A:
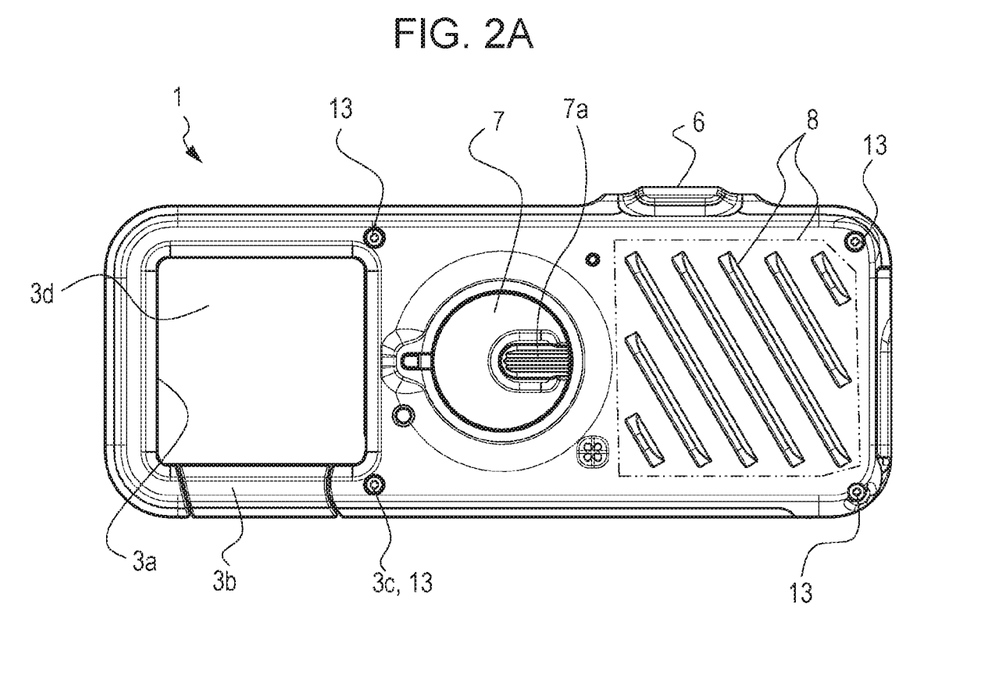
FIGS. 2A to 2D are drawings illustrating open and closed states of a carabiner portion according to the first exemplary embodiment.
Figure 2B:
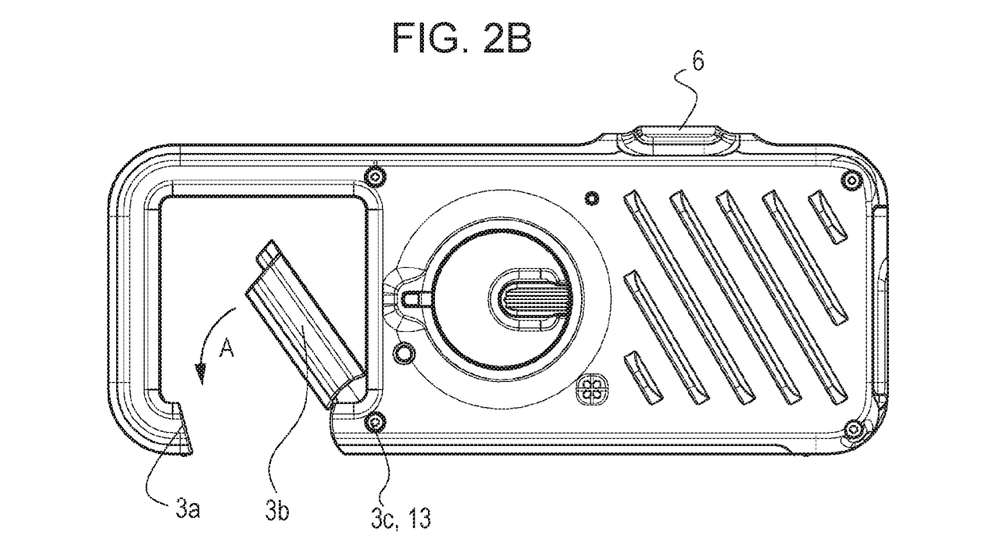
Figure 2C:
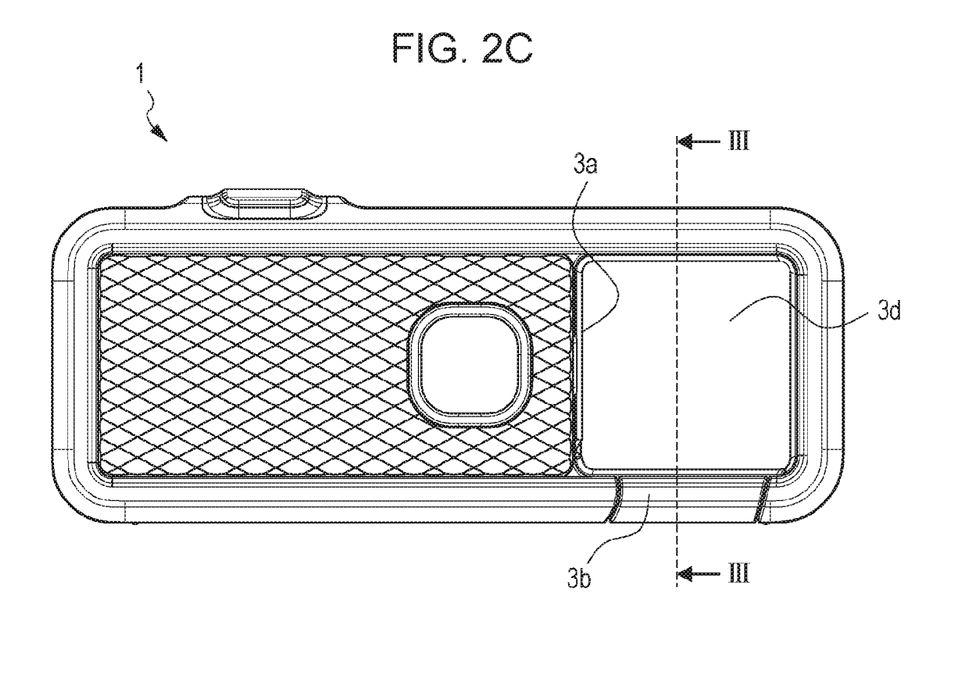
Figure 2D:
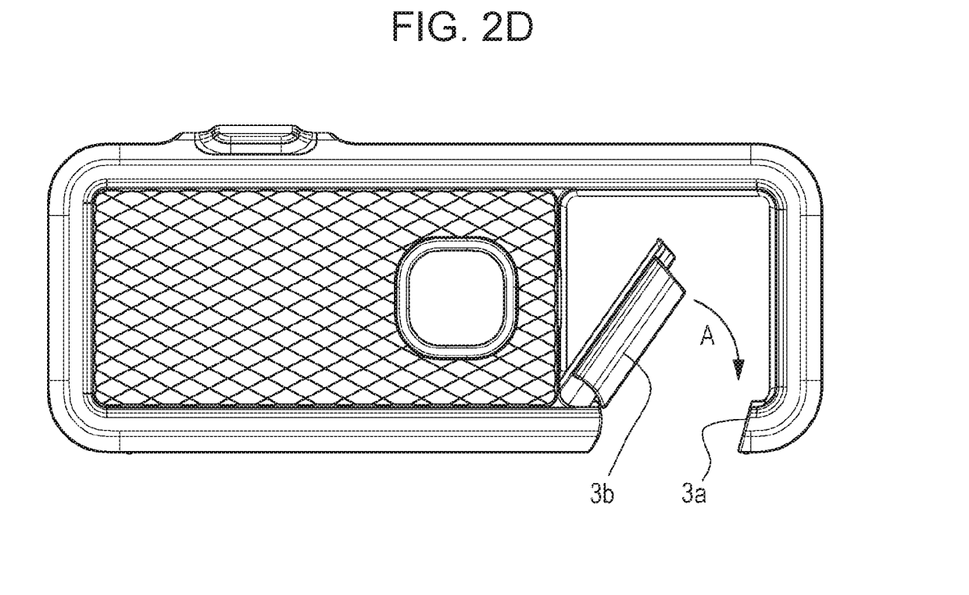

A configuration of the carabiner portion will be described next. FIGS. 8A and 8B are diagrams illustrating the carabiner portion of the digital camera 1 of the present exemplary embodiment. The slanted portions in FIGS. 8A and 8B are the carabiner portion 3 in the present exemplary embodiment. FIG. 2A is a diagram illustrating a closed state of the carabiner portion 3 and FIG. 2B is a diagram illustrating an open state of the carabiner portion 3.

In the carabiner portion 3, a frame shape is formed by a fixed member 3a and a swinging member 3b. Reference sign 3d is a cavity and forms an opening. The swinging member 3b is supported by a pivot shaft 3c and is pivotable about the pivot shaft 3c. By pivoting the swinging member 3b to a predetermined angle, an open state can be reached. Furthermore, the pivot shaft 3c also serves as a screw 13 and is also a fastening member that fixes the front cover 1a and the rear cover 1b to each other.

The swinging member 3b is an opening and closing member that opens and closes the carabiner portion 3 and receives bias force at all times in a direction of an arrow A, which is a direction in which the closed state is reached, from a spring member (not shown). A position of the swinging member 3b is restricted by being abutted against the fixed member 3a. In order to turn the swinging member 3b to the open state from the closed state, it is only necessary to push the swinging member 3b with force that is larger than the bias force exerted from the spring member.

The carabiner portion 3 of the present exemplary embodiment functions as a carabiner by having the open state and the closed state described above. Note that for convenience sake, the carabiner portion 3 is described as if the carabiner portion 3 is an independent part; however, in the present exemplary embodiment, the fixed member 3a of the carabiner portion 3 is a portion of the from cover 1a and the rear cover 1b of the digital camera 1. It can be said that the carabiner portion 3 forms a portion of the exterior of the digital camera 1. In other words, the digital camera 1 itself has a structure of a carabiner. It goes without saying that the carabiner portion 3 and the digital camera 1 do not have to be integrally formed. For example, the carabiner portion illustrated by hatching in FIGS. 8A and 8B may be prepared as a separate member, and may be configured so as to be joined to the housing of the digital camera with screws.

Figure 7A:
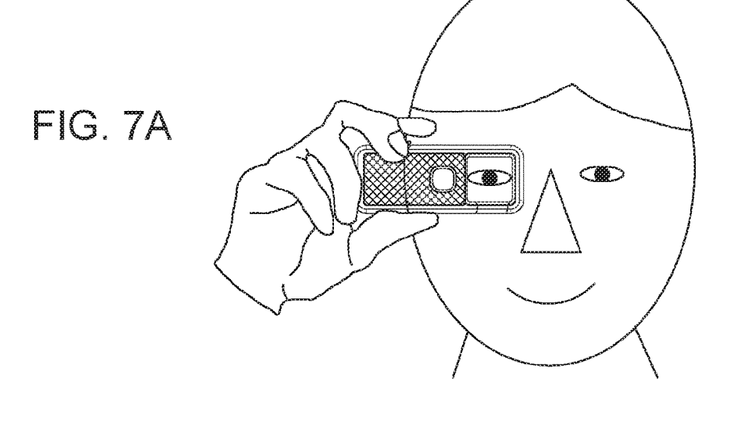
FIGS. 7A to 7C are drawings illustrating examples of use of the digital camera.

Note that in the present exemplary embodiment, the frame-shaped carabiner portion 3 also functions as a see-through viewfinder when viewing an object in the shooting direction. As illustrated in FIG. 7A, when shooting with the digital camera 1, the shooter holds the digital camera 1 towards the object such that front side is closest to the object and confirms the shooting range by looking at the object through a viewfinder frame, that is, the carabiner portion 3. The cavity 3d of the carabiner portion 3 has a rectangular shape (including a rectangle with rounded corners) order to easily specify the horizontal and vertical planes of the composition when being looked through as the viewfinder frame.

A shape of the carabiner portion will be further described herein. Typically, the user performs shooting while causing the camera main body to squarely oppose the object. However, it is not easy for the user to recognize a state in which the camera main body does not squarely oppose the object, in other words, it is not easy for the user to recognize a state in which an image pickup optical axis is inclined against the object. Accordingly, the digital camera 1 according to the present exemplary embodiment includes the opening portion (an inside of the carabiner portion 3) that has a tapered shape. FIGS. 3A to 3D are cross-sectional views of a portion in FIG. 2C and are cross-sectional views illustrating the shape of the opening portion. It is assumed that the object is located in the +Z direction of the arrow illustrated in each of the FIGS. 3A to 3D. The fixed member 3a and the swinging member 3b of the carabiner portion 3 have tapered shapes that widens in the +Z direction, or towards the object side. The tapered shapes forms tapered surfaces tapered at angle α. With the above, when the camera main body, in other words, the image pickup optical axis, squarely opposes the object, a taper surface 3aa or a taper surface 3ba cannot be seen by the user looking through the carabiner frame 3; however, when the image pickup optical axis is inclined at angle α or more against the object, the taper surface 3aa or the taper surface 3ba becomes visible to the user. An area of the taper surface 3aa or the taper surface 3ba visible to the user becomes larger as the angle of the image pickup optical axis inclined against the object becomes larger. By having the user change the orientation of the camera so that the area of the taper surface that is visible to the user is reduced, the camera will oppose the object more squarely thereby reducing a number of failed images being captured. The taper surfaces function as indicators for the user. Furthermore, the colors of the taper surface 3aa and the taper surface 3ba may be changed so as to be different from that of the surrounding member or, even when the colors are the same, emboss processing that is different from the surrounding member may be performed to change the reflectivities of the surfaces. By so doing, the user will be able to distinguish the taper surfaces from the other surfaces, and visibility will be improved.

Figure 3A:
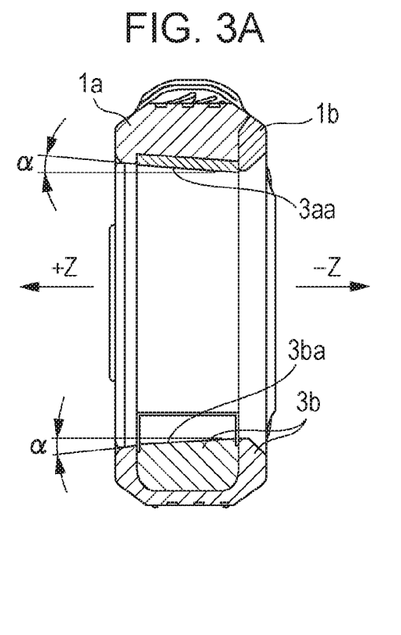
FIGS. 3A to 3D are cross-sectional views of a portion in FIG. 2C.
Figure 3B:
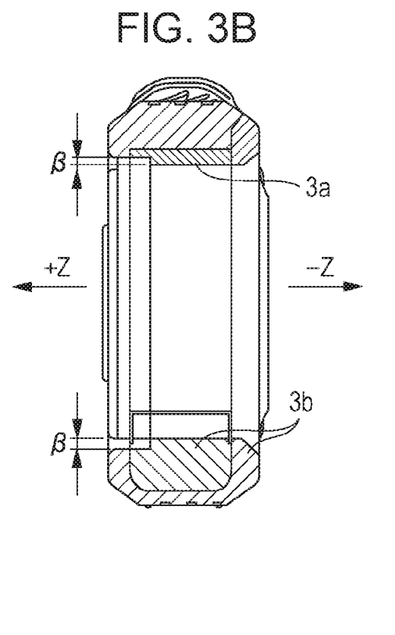
Figure 3C:
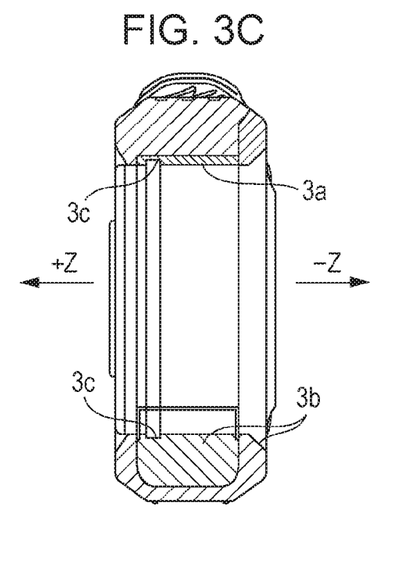
Figure 3D:
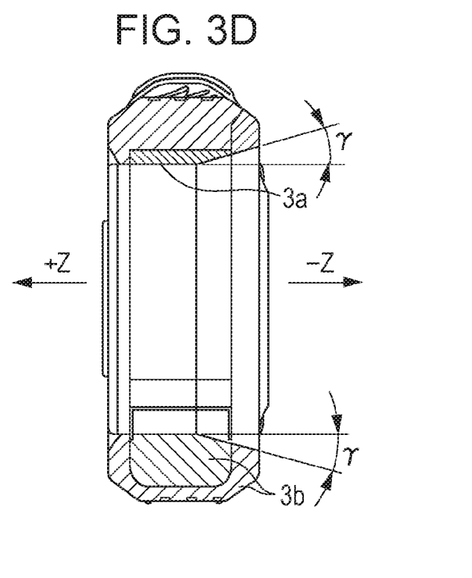

Other examples of the shape are illustrated in FIGS. 3B to 3D. In the example illustrated in FIG. 3B, rather than the tapered shape, there is a step β in each of the fixed member 3a and the swinging member 3b of the carabiner portion 3. When the image pickup optical axis is squarely opposing the object, the user will not be able to see the boundary of the step; however, when the image pickup optical axis is inclined against the object, the user will be able to see the boundary of the step.

In the example illustrated in FIG. 3C, rather than the tapered shapes, groove shapes 3c are formed in the fixed member 3a and the swinging member 3b of the carabiner portion 3. When the image pickup optical axis is squarely opposing the object, the user will not be able to see the groove portion 3c; however, when the image pickup optical axis is inclined against the object, the user will be able to see the groove portion 3c. Note that with the aim to further have the groove shapes stand out, color providing process in which ink that has a striking color is injected into the groove portions may be performed. Furthermore, rather than forming the grooves, lines that are distinguishable to the user may be drawn instead.

In the example illustrated in FIG. 3D, taper surfaces having an angle γ are formed in the fixed member 3a and the swinging member 3b of the carabiner portion 3 by performing taper processing in a direction opposite to that in FIG. 3A. Although not illustrated, a similar effect can be obtained by having the shapes in FIGS. 3B to 3D be combined with the taper shape in FIG. 3A. As illustrated in FIGS. 3A, 3B, and 3C, a projection of an opening of the first surface of the carabiner 3 in the optical axis direction includes a projection of an opening of the second surface in the optical axis direction, and the opening of the first surface is larger than the opening of the second surface. For example, in FIGS. 3A and 3B, a projection of an opening on the +Z side in the optical axis direction includes, in the Z axis direction, a projection of an opening on the −Z side in the optical axis direction, and the opening on the +Z side is larger than the opening on the −Z side. Furthermore, in FIG. 3D, the projection of the opening on the −Z side in the Z axis direction includes the projection of the opening on the +Z side in the Z axis direction, and the opening on the −Z side is larger than the opening on the +Z side.

A relationship between the carabiner portion 3 and other members will be described next. The relationship between the carabiner portion 3 and the other members directly influence operation of the digital camera 1 during the shooting. A specific description of the above will be given below.

As illustrated in FIG. 1A, first, a shooting lens 2 and the finder are, desirably, disposed as close as possible to each other. With such a configuration and an arrangement, a parallax between the shooting lens 2 and the finder can be reduced when shooting at a short range. Furthermore, the shooting lens 2 and the release button 6 are, desirably, disposed as far as possible from each other. With such an arrangement, when the digital camera 1 is held, the finger of the shooter can be effectively prevented from covering the shooting lens 2.

Figure 7B:
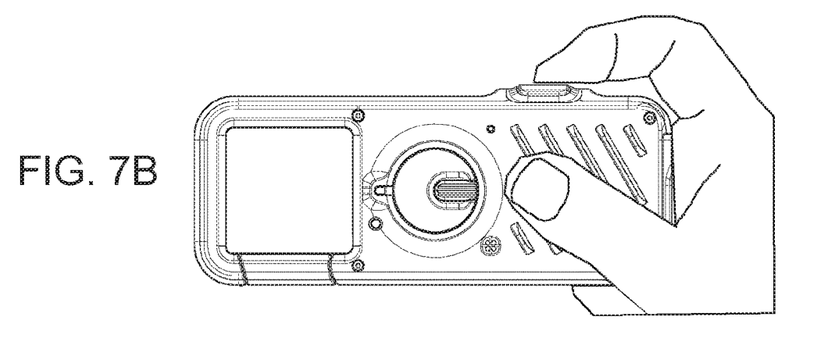

Furthermore, the carabiner portion 3 and the release button 6 are disposed so that the projections of at least a portion of the carabiner portion 3 and the release button 6 do not overlap each other in the operation direction of the release button 6, in other words, the pushing down direction of the release button 6. Referring to FIG. 7B, the configuration of the above will be described. As illustrated in FIG. 7B, in the digital camera 1 of the present exemplary embodiment, it is assumed that the shooter performs shooting using only the right hand. If the swinging member 3b of the carabiner portion 3 is at a position where the projection thereof overlaps the projection of the release button 6, when the release button 6 is pushed down, the right-hand fingers holding the camera comes into contact with the swinging member 3b and the swinging member 3b may be pivoted unintentionally. The digital camera 1 of the present exemplary embodiment is capable of reducing the occurrence of failed images, such as image blur and inclination of the composition, by disposing the carabiner portion 3 and the release button 6 so that the projections thereof do not overlap each other.

Figure 7C:
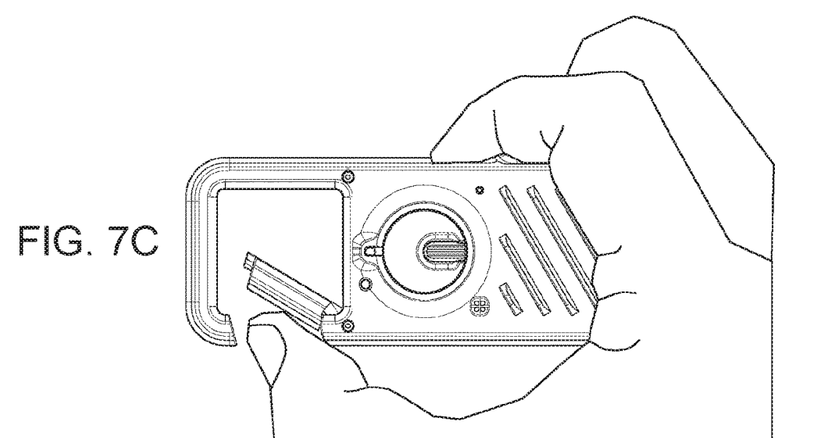

More specifically, in the digital camera 1 according to the present exemplary embodiment, as illustrated in FIGS. 1A and 1B, the carabiner portion 3, the lens portion 2, and the back surface grip portion 8 are disposed in that order from the left-hand side when viewed from the shooter side (on side opposite the object side while the shooting is performed with the digital camera in a horizontal position, the same is assumed in the description hereinafter as well), and the release button 6 is disposed above the back surface grip portion 8. With such an arrangement, the distance between the carabiner portion 3 and the release button 6 is obtained. With the above, as illustrated in FIG. 7B, when the shooting operation is performed while the digital camera 1 is held in the right hand, the right-hand finger of the shooter does not easily touch the swinging member 3b of the carabiner portion 3. Furthermore, since the back surface grip portion 8 and the release button 6 are disposed close to each other, when operating the release button 6, the digital camera 1 can be held so as to be covered by the palm; accordingly, the release button 6 can be pushed in a stable manner. Furthermore, by providing the carabiner portion 3 on the left-hand side of the shooter, when holding the digital camera 1 that is covered by the palm of the right hand, the visibility of the carabiner portion 3 serving as a finder is not impaired. Furthermore, the release button 6 and the swinging member 3b of the carabiner portion 3 are, with respect to each other, provided in a diagonal direction of the back surface of the digital camera (the release button 6 on the upper right and the swinging member 3b on the lower left, in FIG. 7B). With such an arrangement, a series of movements of unhooking the camera from a backpack by opening the swinging member 3b with the thumb of the right hand as illustrated in FIG. 7C, and holding and gripping the camera using the thumb of the right hand as illustrated in FIG. 7B can be carried out with one hand in a smooth manner. From the viewpoint of operationality, desirably, the entire carabiner portion 3 is disposed so as to be contained in any of the left half region of the back surface of the digital camera 1, and the entire back surface grip portion 8 is disposed so as to be contained in any of the right half region of the back surface of the digital camera 1.

Furthermore, as illustrated in FIG. 1B, in the digital camera 1 of the present exemplary embodiment, the mode switching dial 7 is disposed between the carabiner portion 3 and the back surface grip portion 8. The mode switching dial 7 is a rotary dial, and switching of the shooting mode, such as the moving image mode or the still image mode, and an operation such as turning the power off can be performed easily and swiftly by hooking the linger on a finger hooking portion 7a and performing a turning operation. Since the finger hooking portion 7a is disposed closer to the back surface grip portion 8 than the carabiner portion 3, the shooter can easily hook the finger on the finger hooking portion 7a While holding the digital camera 1 with the right hand. Furthermore, since the back surface grip portion 8 and the release button 6 are disposed close to each other as well, when performing a shooting operation while holding the digital camera 1 with the right hand, the thumb can be hooked on the finger hooking portion 7a of the mode switching dial 7 while the index finger is placed on the release button 6. With the above, the shooting operation and the mode switching operation can be performed swiftly with a one hand operation.

Furthermore, the position of the microphone 5 is a portion above the lens 2, which is a location that is not covered by the hand when performing the series of operations for such a one hand operation and a location where, if a noise were to be generated between the swinging member 3b and the fixed member 3a when closing the carabiner portion 3, the noise is not easily propagated to the microphone 5.

Note that while the digital camera 1 of the present exemplary embodiment is described on the premises that the shooter performs shooting using only the right hand, it goes without saying that it may be assumed that shooting is performed with only the left hand. In such a case, the digital camera 1 may be configured so as to be inverted as a mirror image of the configuration in FIGS. 2A and 2C.

Note that the size of the carabiner portion 3 serving as the cavity 3d is desirably a size that allows a belt loop of a pair of trousers of the shooter or to a belt portion of a backpack or the like to be fixed thereto. Furthermore, if too large, the portability will be impaired. Accordingly, the largest width of the see-through opening portion is about 30 mm in the present exemplary embodiment, and when considering the mountability and the portability, the largest width is desirably 20 mm or more and less than 50 mm. Desirably, the aspect ratio of the cavity 3d is closer to a square when the aspect ratio thereof is compared with the aspect ratio of the image pickup element (not shown) that is 4 (width) to 3 (height) and the cavity 3d is not vertically long. The reason for the above is since the cavity 3d is used as a finder, if the cavity 3d is vertically long, inevitably, the dimension of the camera in the up-down direction becomes large, which becomes an obstacle to the movement of the one hand operation described above.

Furthermore, the swinging member 3b of the carabiner portion 3 does not necessarily have to be disposed on the tripod hole 12 side as illustrated in FIG. 1B, and may be disposed on the upper surface portion or a lateral surface portion of the digital camera 1.

Furthermore, the body housing of the digital camera 1 of the present exemplary embodiment is formed of rigid plastic to obtain an anti-shock property. By performing an anti-slipping process on the body housing by painting, the body housing can be gripped effectively.

Furthermore, the body housing may be covered by an elastomer member such as rubber. Portions other than the lens portion 2, the changeable panel 4, the release button 6 and the mode switching dial 7 that are operation members, the reset button 11, the LED window 10 that is a window member, and the screws 13 are covered by the elastomer member. With the above, the elastomer member serving as a shock absorbing member can soften the impact on the image pickup unit and internal electronic components when dropped. Furthermore, due to the rubber elasticity and the grip performance of the elastomer member, the digital camera 1 held in one hand can be effectively prevented from being dropped due to slipping from the hand unintentionally.

Figure 4A:
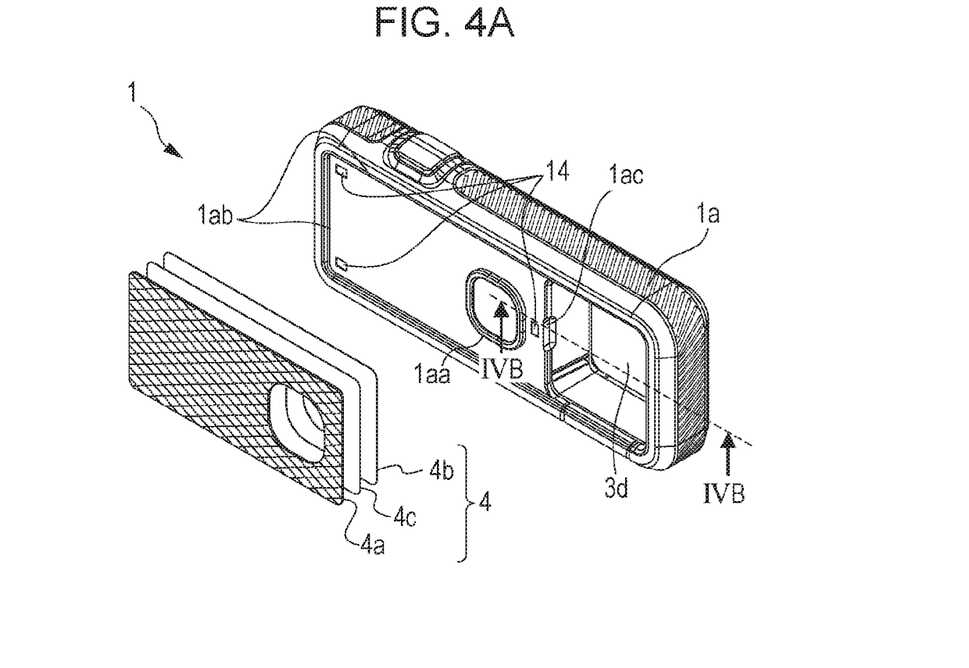
FIGS. 4A and 4B are drawings illustrating states in which the changeable panel has been attached and detached according to the first exemplary embodiment.
Figure 4B:
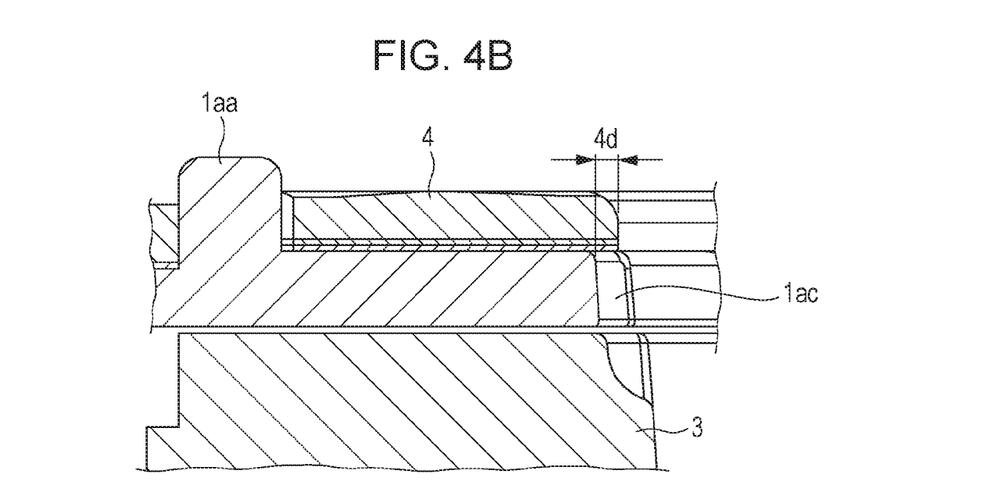

Referring hereinafter to FIGS. 4A and 4B, a description of the changeable panel 4 will be given. FIG. 4A is a perspective view illustrating a state in which the changeable panel 4 has been removed from a digital camera main body. FIG. 4B is a partial cross-sectional view of a IVB-IVB portion illustrating a state in which the changeable panel as been fitted to the digital camera main body.

As illustrated in FIG. 4A, the changeable panel 4 includes an appearance portion 4a that is a thin polycarbonate sheet material on which printing has been performed or on which a designed surface shape has been given, a steel plate 4b that is attracted to magnets 14 described later, and a two-sided adhesive tape 4c that fixes the above two to each other. Furthermore, the front surface of the changeable panel 4 illustrated in FIG. 4A has a meshed and uneven shape. By having such a shape, the digital camera 1 held in one had can be effectively prevented from being dropped due to slipping from the hand unintentionally.

It is assumed that, regarding the changeable panel 4, a plurality of types of changeable panels 4 having various appearance portions 4a will be provided by manufacturers. Accordingly, by owning a plurality of changeable panels 4 for the digital camera 1 that the user owns, the user will be able to use the digital camera 1 in a manner, such as replacing the changeable panel 4 and changing the appearance of the digital camera 1 in accordance with the situation. Accordingly, it is desirable that the changeable panel 4 is configured to be easily replaced by the user.

In the present exemplary embodiment, in fitting the changeable panel 4, the position is determined by a protruded shape 1aa of the front cover 1a around the lens portion 2 and by an erect wall portion 1ab in which an outer shape portion of the changeable panel 4 is fitted. The changeable panel 4 is held by three magnets 14 fixed to the front cover 1a.

Note that in the exemplary embodiment described above, while the changeable panel 4 is fixed using the magnets 14, if underwater filming is not taken into consideration, a strip of two-sided adhesive tape (not shown) that has strong adhesiveness on the front cover 1a side and weak adhesiveness on the changeable panel 4 side may be used in place of the magnets 14.

Furthermore, as illustrated in FIG. 4B, the changeable panel is removed by the user inserting a finger in a recessed shape 1ac provided in the erect wall portion serving both as a frame of the carabiner portion 3 of the front cover 1a and as a frame of the finder. The user can easily remove the changeable panel 4 by lifting a projection 4d of the changeable panel 4 with a finger. In the present exemplary embodiment, by providing the recessed shape 1ac not on the release button 6 side but on the carabiner portion 3 side, the user can hook a tip of a finger on the recessed shape 1ac while inserting the finger into the space of the cavity 3d of the carabiner portion 3. As a result, the changeable panel 4 can be removed more easily.

According to the first exemplary embodiment, an imaging device can be provided that is capable of effectively preventing an erroneous operation from being performed during shooting with the imaging device including the carabiner portion. Furthermore, the first exemplary embodiment also enables the user to easily replace the changeable panel.

Second Exemplary Embodiment

Figure 5A:
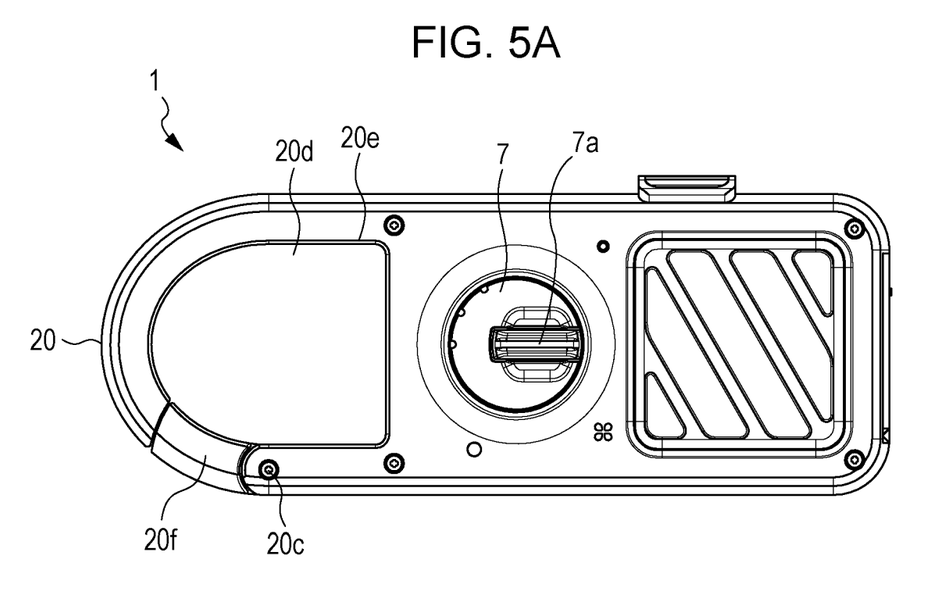
FIGS. 5A and 5B are drawings illustrating the open and closed states of a carabiner portion according to a second exemplary embodiment.
Figure 5B:
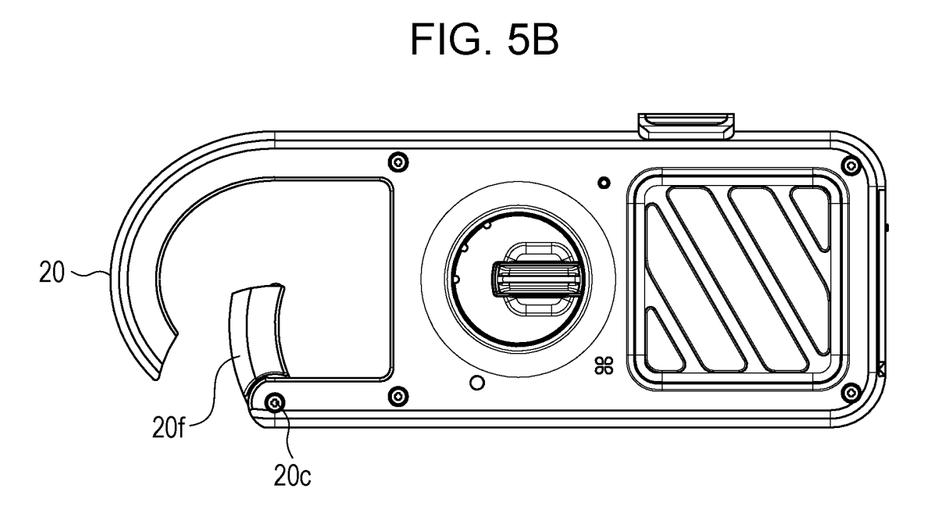

Referring hereinafter to FIGS. 5A and 5B, a description of a second exemplary embodiment will be described. Other than the details described below, the configuration is similar to that of the first exemplary embodiment; accordingly, description thereof will be omitted.

As illustrated in FIGS. 5A and 5B, the digital camera 1 of the present exemplary embodiment includes a carabiner portion 20 in which a portion of the shape of the carabiner portion 3 according to the first exemplary embodiment has an elliptical shape. FIG. 5A is a diagram illustrating a closed state of the carabiner portion 20 and FIG. 5B is a diagram illustrating an open state of the carabiner portion 20.

As illustrated in FIG. 5A, in the carabiner portion 20 of the second exemplary embodiment, the mode switching dial 7 side has a halved rectangular shape in which, same as the first exemplary embodiment, straight lines orthogonally intersect each other, and the lateral surface side of the digital camera 1 on the opposite side has an elliptical shape.

In FIG. 5B, a swinging member 20f of the carabiner portion 20 reaches, same as the first exemplary embodiment, an open state when pivoted about a pivot shaft 20c to a predetermined angle. Furthermore, same as the first exemplary embodiment, a cavity 20d portion has a tapered shape.

Figure 6A:
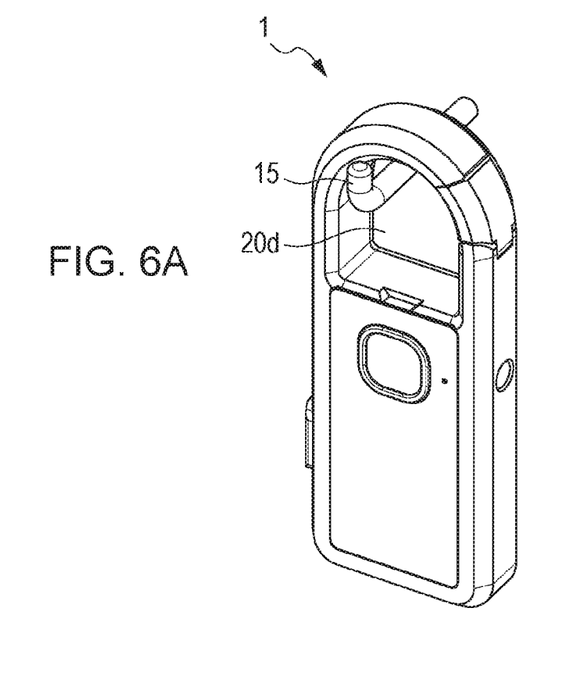
FIGS. 6A and 6B are drawings illustrating a state in which the carabiner portion is engaged with a mounting hook with the digital camera in a vertical state.
Figure 6B:
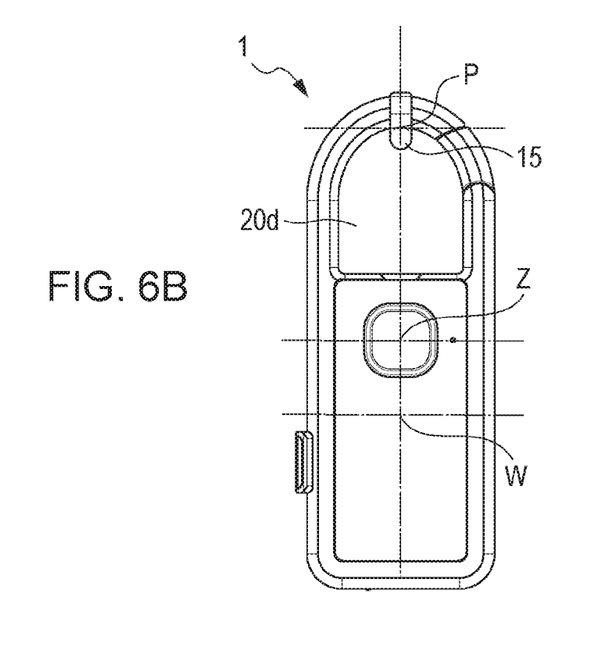

FIG. 6A is a perspective view illustrating a state in which the carabiner portion 20 is engaged with a mounting hook 15 with the digital camera in a vertical state. FIG. 6B is a front view of FIG. 6A.

A position where the mounting hook 15 and a fixing portion 20e of the carabiner portion 20 are engaged with each other while the carabiner portion 20 of the digital camera 1 is engaged with the mounting hook 15 fixed to the wall is, as illustrated in FIG. 6B, an apex P of the elliptical shape. In the above state, when a center of gravity W of the digital camera 1 is on an extended line of a straight line connecting the apex P of the elliptical shape and an imaging optical axis Z of the lens portion 2, the digital camera 1 can be positioned without any inclination and rotation as illustrated in FIG. 6B. With the above, an image close to horizontal can be easily taken without any special positioning, just by engaging the digital camera 1 with the mounting hook 15.

Furthermore, the mode switching dial 7 side has a rectangular shape because the rectangular shape serves as a guide to set the horizontal plane and the vertical plane when handheld photography is performed.

When the elliptical shape of the exemplary embodiment described above is a shape in which the apex P is located at a single portion, such as a semicircular shape, a portion of an arc shape, or a corner of a rectangle, a similar effect can be obtained.

Other Exemplary Embodiments

The exemplary embodiments described above have been described with a so-called carabiner; however, various configurations having a frame structure in which at least one end can be opened and closed can be adopted.

Furthermore, while the exemplary embodiments described above have been described with a digital camera as an example, the disclosure can be used in an electronic device such as a video camera or a smartphone provided with an image pickup element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging device comprising:
a lens; and
a frame portion that forms an opening in an optical axis direction of the lens from a first surface of a housing of the imaging device, the opening extending through the housing towards a second surface of the housing of the imaging device such that the second surface is opposed to the first surface of the imaging device, and wherein at least a portion of the frame portion is an opening and closing member, and wherein the lens is disposed on either one of the first surface and the second surface, and
wherein a projection of an opening of the first surface in the optical axis direction includes a projection of an opening of the second surface in the optical axis direction, and the opening of the first surface is larger than the opening of the second surface.

2. The imaging device according to claim 1, wherein a distance from a center of the opening of the first surface to an inner wall of the frame portion is larger than a distance from a center of the opening of the second surface to the inner wall of the frame portion.

3. The imaging device according to claim 1, wherein an inner wall of the frame portion forms a predetermined angle with an optical axis in the optical axis direction.

4. The imaging device according to claim 1, wherein an inner wall of the frame portion includes an indicator that is visible to an operator of the imaging device.

5. The imaging device according to claim 1, wherein the opening and closing member of the frame portion is a swinging member pivotably supported by a shaft.

6. The imaging device according to claim 1, wherein the opening and closing member is opened and closed with a carabiner structure.

7. The imaging device according to claim 1, wherein the frame portion forms a portion of an exterior of the housing of the imaging device.

8. The imaging device according to claim 1, wherein a color of an inner wall of the frame portion is different from a color of other surfaces of the frame portion.

9. The imaging device according to claim 1, wherein an inner wall of the frame portion is processed differently from other surfaces of the frame portion.

10. The imaging device according to claim 1, wherein an inner wall of the frame portion has a different surface reflectivity from other surfaces of the frame portion.

11. The imaging device according to claim 1, wherein a predetermined operation member is disposed on other, on which the lens is not disposed, of the first surface and the second surface.

12. The imaging device according to claim 1, wherein a finger rest is disposed on other, on which the lens is not disposed, of the first surface and the second surface.

* * * * *